US012612316B2

(12) United States Patent
Delaire et al.

(10) Patent No.: US 12,612,316 B2
(45) Date of Patent: Apr. 28, 2026

(54) FLUID TREATMENT METHOD AND PLANT

(71) Applicant: SUEZ INTERNATIONAL, Paris la Défense (FR)

(72) Inventors: Mélanie Delaire, Martignas sur Jalle (FR); Ludovic Tricottet, Péronne (FR)

(73) Assignee: Suez International, Paris (FR)

( * ) Notice: Subject to any disclaimer, the term of this patent is extended or adjusted under 35 U.S.C. 154(b) by 431 days.

(21) Appl. No.: 18/026,243

(22) PCT Filed: Sep. 16, 2021

(86) PCT No.: PCT/EP2021/075524
§ 371 (c)(1),
(2) Date: Mar. 14, 2023

(87) PCT Pub. No.: WO2022/058446
PCT Pub. Date: Mar. 24, 2022

(65) Prior Publication Data
US 2023/0365432 A1 Nov. 16, 2023

(30) Foreign Application Priority Data

Sep. 17, 2020 (FR) ...................................... 2009442

(51) Int. Cl.
*C02F 1/28* (2023.01)
(52) U.S. Cl.
CPC .......... *C02F 1/281* (2013.01); *C02F 2303/16* (2013.01); *C02F 2303/18* (2013.01)
(58) Field of Classification Search
CPC ...... C02F 1/281; C02F 1/283; C02F 2303/16; C02F 2303/18
See application file for complete search history.

(56) References Cited

U.S. PATENT DOCUMENTS 4,105,549 A 8/1978 Kakumoto et al.

FOREIGN PATENT DOCUMENTS

| | | |
|---|---|---|
| CN | 209411838 | 9/2019 |
| FR | 3003477 A1 | 9/2014 |
| JP | S5360881 A | 5/1978 |
| JP | H04122495 A | 4/1992 |
| JP | H05293461 A * | 11/1993 |
| JP | H06254579 A | 9/1994 |

(Continued)

OTHER PUBLICATIONS

International Search Report and Written Opinion of the International Searching Authority, issued in PCT/EP2021/075524, mailed Dec. 2, 2021; ISA/EP.

(Continued)

*Primary Examiner* — Dirk R Bass
(74) *Attorney, Agent, or Firm* — Harness, Dickey & Pierce, P.L.C.

(57) ABSTRACT

A method for treating a fluid, notably liquid, in particular water, containing pollutants, is performed by passing a downward stream of fluid through a bed of activated carbon in the form of grains in a treatment station. The method includes a partial renewal of activated carbon including at least one injection of activated carbon and at least one extraction of activated carbon. An installation suitable for implementation of the fluid treatment method is also disclosed.

12 Claims, 1 Drawing Sheet

(56)         References Cited

FOREIGN PATENT DOCUMENTS

| | | |
|---|---|---|
| JP | H06312177 A | 11/1994 |
| JP | H08214048 A | 8/1996 |

OTHER PUBLICATIONS

Japanese Patent Office—Office Action in corresponding JP Patent Application No. 2023-517338 (Mar. 25, 2025).
China National Intellectual Property Administration Notice of the First Office Action for CN Application No. 202180068073.2 (May 14, 2025).
Japanese Patent Office—Office Action in corresponding JP Patent Application No. 2023-517338 (Jul. 8, 2025).

* cited by examiner

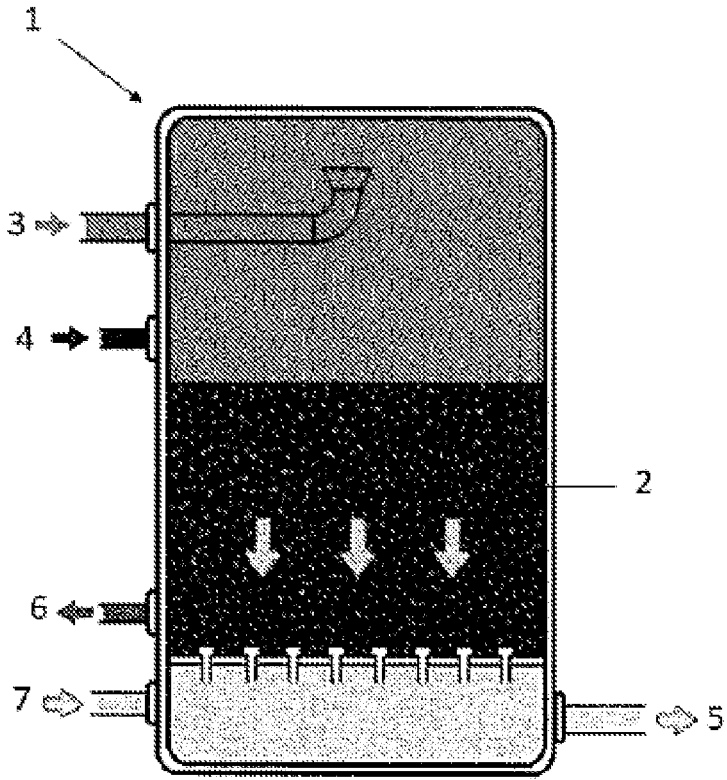

FLUID TREATMENT METHOD AND PLANT

CROSS-REFERENCE TO RELATED APPLICATIONS

The application is a National Phase Entry of International Patent Application No. PCT/EP2021/075524, filed on Sep. 16, 2021, which claims priority to the French Patent Application No. FR2009442, filed Sep. 17, 2020, both of which are incorporated by reference herein.

TECHNICAL FIELD

The invention relates to a method for treating a fluid, notably water, in particular water to be made drinkable, and also an urban or industrial effluent, by passing the fluid through a bed of activated carbon.

BACKGROUND

For the treatment of fluids, and in particular for the production of drinking water, or the treatment of effluents, the reduction of the amount of organic contaminants contained in raw water or in an effluent may be proposed by means of a step of adsorbing said material. Indeed, the increasing load of organic contaminants (natural organic matter and micropollutants of anthropogenic or natural origin) observed in resources means that drinking water producers and effluent treatment operators must refurbish the treatment facilities thereof, which have become unable to achieve quality targets. Producers of drinking water are confronted with such growing load of organic contaminants when designing a new treatment installation. Finally, effluent treatment operators, whether concerned with industrial or service industry effluents before discharge into natural environments or effluents to be rendered drinkable (wastewater) either directly or indirectly, can also benefit from treatment that takes a higher presence of organic contaminants into account. Taking into account such significant pollution by organic contaminants can include the addition, as of the design or refurbishment stage, of a refining facility, in particular using activated carbon, such as in particular filtration and/or adsorption by a bed of granular activated carbon (GAC).

In the field of water treatment, taking account of the emergence of organic micropollutants of synthetic origin still needs to be improved, especially when they are present in small quantities. More particularly some of the emerging pollutants are difficult to absorb, whether same are pollutants in the form of small molecules, polar molecules or hydrophilic molecules. In particular, pesticide metabolites can thus be found downstream of the adsorption step, such as an adsorption step with granular activated carbon. The level of such emerging pollutants at the end of the treatment facility can then exceed the regulatory thresholds if the pollutants are specifically regulated or in any case can carry a risk which has to be anticipated for emerging pollutants which are not yet regulated. And yet, refining treatment facilities with activated carbon, even same equipped for periodic renewal, have been designed for certain conventional pollutants without being designed for adapting to the emerging pollutants which are more difficult to remove.

It is known from document FR3003477 to use an activated carbon filter or activated carbon reactor for retaining organic matter or other natural or artificial pollutants. The document FR3003477 in particular, proposes the use of a bed of granular activated carbon in an ascending stream but without appreciable expansion, with a further phase of washing the filter made up of the bed of activated carbon. Washing is carried out by a substantial expansion of the bed. Such type of method generally requires a treatment of the fines upstream of the injection into the carbon filter and can only work with a minimum flow-rate of fluid.

It is known how to use conventional carbon filters for water treatment, but such type of method cannot be used for adjusting the activated carbon to the quality of the fluid to be treated and for maintaining and continuously controlling the quantity of pollutants. Hence, there is a need to improve the treatment of a fluid, such as water, so as to include in particular the new contaminants which are difficult to remove, especially when same are present in small proportions, while simplifying or even reducing the installations needed.

SUMMARY

Such targets are achieved by means of the new method of the invention. The invention relates to a method for treating a fluid, notably liquid, in particular water, containing pollutants, by passing a downward stream of fluid through a bed of activated carbon in the form of grains in a treatment station, said method comprising a partial renewal of activated carbon including at least one injection of activated carbon and at least one extraction of activated carbon.

According to one embodiment, each injection of activated carbon is carried out during an interruption phase of the method. Preferentially, the method of the invention comprises at least one interruption phase during which activated carbon is injected and during which activated carbon is not extracted. Preferentially, the method of the invention comprises an interruption phase comprising successively:

an interruption of the stream of fluid to be treated,
an injection of activated carbon into the treatment station,
a step of removing fines from activated carbon,
a restarting of the stream of fluid to be treated.

Preferentially, according to the above embodiment, the step of removing fines allows to eliminate carbon fines having a size of less than 0.2 mm. Preferentially, the step of removing fines is implemented in backflow. According to one embodiment of the invention, the activated carbon bed is a fixed activated carbon bed. Preferentially, the method comprises interruption phases suitable for the fluids needs downstream of the method. According to one embodiment, the method of the invention comprises at least one step of removing fines and at least one washing step, implemented during distinct interruption phases.

The invention further relates to an installation for implementing the method according to the invention, comprising a treatment station 1, said treatment station comprising:

grains of activated carbon 2,
an opening 3 arranged for feeding the fluid to be treated into the treatment station,
an opening 4 arranged for injecting grains of activated carbon into the treatment station,
an opening 5 arranged for recovering the treated fluid after passing through the bed of activated carbon,
an opening 6 arranged for extracting grains of activated carbon from the treatment station.

According to one embodiment, the treatment station 1 further comprises an opening 7 arranged for feeding air into the treatment station during a washing step or a step of removing fines, said opening 7 preferentially being situated at a lower altitude than the opening 6. According to one embodiment, the installation further comprises a hydraulic circuit downstream of the treatment station, connected to the opening 6.

The method of the invention, due to an optimal use of activated carbon, can be used for obtaining drinking water which meets the regulatory requirements, all this in a simple installation which does not require large equipment. More specifically, according to an advantageous embodiment, the activated carbon can be injected without pretreatment directly into the treatment station using a step of removing fines which can be implemented directly in the treatment station during for example an interruption step. The method of the invention makes it possible to dispense with expensive and bulky equipment dedicated to removing fines since the washing pump of the activated carbon reactor (filter) is suitable for removing fines.

BRIEF DESCRIPTION OF THE DRAWINGS

FIG. 1 shows a treatment station according to an embodiment of the invention.

DETAILED DESCRIPTION

The invention relates to a method for treating a fluid, notably liquid, in particular water, containing pollutants, by passing a downward stream of fluid through a bed of granular activated carbon (GAC), said method comprising a partial (or gradual) renewal of the activated carbon including at least one injection of activated carbon (new and/or regenerated) into the treatment station and at least one extraction of activated carbon (used) from the treatment station. The proposed treatment method aims at eliminating pollutants contained in a fluid to be treated. The fluid to be treated can be water, in particular water to be made drinkable, and also an urban or industrial effluent (in particular leachates, which are liquid waste storage effluents), before discharge into the natural environment or effluents to be made drinkable (such as wastewater which are urban effluents), either directly or indirectly.

Hereinafter in the document, the term "pollutant" refers to both organic matter and micropollutants. A micropollutant can be defined as an undesirable substance detectable in the environment at a very low concentration (microgram per liter or even nanogram per liter). The presence of micropollutants in water is, at least in part, due to human activity (industrial methods, agricultural practices or drug and cosmetic residues). The micropollutant is characterized as having the potential, at such very low concentrations, to cause negative effects on living organisms due to its toxicity, its persistence and its bioaccumulation, or due to organoleptic problems (taste or odor, in particular relevant when treating water to be made drinkable). There are many (more than 110,000 molecules are listed by European regulations) and diverse micropollutants. The diversity of pollutants makes it possible to classify them according to their origin, their nature, or according to their very different chemical properties. Thereby, micropollutants can have a natural origin (such as compounds resulting from soil degradation, including methylisoborneol or MIB, or bacterial residues), a vegetable origin (such as algal metabolites including microcystins), an animal or a human origin. Micropollutants can be classified according to their nature, such as for example polar organic compounds, abbreviated as POC (polar organic compounds) or organometallic compounds, abbreviated as MOC (metal organic compounds). Micropollutants can have very different chemical properties, such as detergents, metals, hydrocarbons, pesticides, cosmetics or even medicines.

According to a particular embodiment, the pollutants are natural and/or synthetic organic materials, such as microorganisms contained in the pollutants. As an example, but not limited to, the fluid to be treated can contain pesticides and/or pesticide metabolites.

Preferentially, the fluid to be treated is a liquid, such as water. According to a particularly preferential embodiment, the method of the invention is a method for treating drinking water.

The water to be treated can be called raw water, and can for example be taken from a watercourse that we will then refer to as surface water, or be taken through a borehole, that we will then refer to as groundwater. The water to be treated can also be an urban effluent (such as wastewater otherwise known as urban wastewater) or an industrial effluent.

Before passing through the bed of activated carbon, the collected water can undergo a pretreatment stage, for example clarification, by means of a decanter or a floater so as to obtain a separation, carried out for example by coagulation so as to retain particulate or colloidal matter, eventually followed, by filtration, in particular sand filtration. The nature of the pretreatment can depend on the origin of the fluid to be treated. If the resource to be treated is groundwater, the pretreatment step can particularly be avoided, just like for surface water. In the case of an effluent, it is advantageous to provide a pretreatment further including biodegradation, for example upstream of the clarification.

Typically, the method of the invention is implemented in an installation comprising at least one treatment station. The treatment station can comprise a fluid inlet and a fluid outlet. The treatment station will further include an inlet for the injection of new and/or regenerated GAC and an outlet for the extraction of used GAC. Preferentially, the inlet for the injection of new and/or regenerated GAC is situated at a greater altitude than the outlet for the extraction of used GAC in the treatment station. Altitude is defined with respect to Earth's gravity.

According to the invention, the stream of fluid is a downward stream. Thus, typically, the treatment station will comprise a fluid inlet (fluid to be treated) in the upper part thereof and a fluid outlet (treated fluid) in its lower part. It will be understood that the upper part is situated at a greater altitude than the lower part. The treatment station will typically not comprise any agitator in order to make such a downward stream possible.

Compared with a method using an upward stream of fluid to be treated, the method of the invention using a downward stream has the advantage of being apt to work between 0 and 100% of the peak flow-rate and under pressure. Furthermore, the downward stream method of the invention allows to provide drinking water without the need for filtration downstream of the activated carbon treatment.

According to the invention, the fluid passes through a bed of activated carbon in the form of grains in a treatment station. The granular activated carbon used for the proposed method typically has for example a particle size distribution from 300 to 2400 μm for at least 85 to 90% by weight of the grains. The dimensions given are the dimensions of the equivalent grain diameter for dry sieving or for wet sieving.

Preferentially, the bed of activated carbon is a fixed (or packed) bed of carbon typically having an apparent specific gravity ranging from 0.35 to 0.55. During the implementation of the method (production phase), the activated carbon bed is advantageously a fixed bed, as opposed to a fluidized bed. In other words, the activated carbon bed is preferentially not fluidized.

The method of the invention can be implemented with different types of GAC. By contrast, the methods of the prior art with a fluidized bed of GAC can only operate with specific GAC apt to be fluidized. The method of the invention comprises a partial renewal of the activated carbon including at least one injection of activated carbon and at least one extraction of activated carbon.

The extraction of activated carbon can be carried out during an interruption phase but the method of the invention will preferentially comprise at least one extraction carried out during a production phase in order to reduce water losses and operating constraints. Preferentially, each extraction will be carried out during a production phase. Typically, in the method of the invention, each injection of activated carbon is carried out during an interruption phase, with the proviso that the method of the invention could comprise only a single injection of activated carbon between two production phases.

Injecting granular activated carbon during an interruption phase reduces the risk of fines crossing to 0. In other words, there is no risk of pollution of the treated water tank and no risk of fines accumulating in the medium unnecessarily increasing the head loss in the GAC reactor/filter. The GAC along with a few fines will settle on the surface and the fines will be removed during an operation of removing fines before restarting the filtration (restarting the method).

Thus, the method of the invention will typically comprise interruption phases and production phases, with the proviso that:
    an interruption phase of the method may not include any injection of activated carbon nor any extraction of activated carbon and
    an interruption phase can include (i) an injection of activated carbon without any extraction of activated carbon or (ii) an extraction of activated carbon without any injection of activated carbon.

Indeed, it is possible to envisage a method comprising an interruption phase comprising an injection of activated carbon (new and/or regenerated) and no extraction of activated carbon (used), and another interruption phase comprising an extraction of activated carbon (used) and no injection of activated carbon (new and/or regenerated).

The renewal of the GAC is a partial renewal. Typically, only a fraction of the activated carbon present in the treatment station is renewed during an interruption phase. We will then refer to as the sequenced renewal of the activated carbon. The partial renewal (sequenced) optimizes the adsorption capacity of the activated carbon. Indeed, new and/or regenerated activated carbon will treat more difficult-to-treat species, such as metabolites, whereas used activated carbon will treat species which are easier to treat, such as pesticides.

During an interruption phase involving both injection of activated carbon and extraction of activated carbon, the quantity of activated carbon extracted and the quantity of activated carbon injected during said interruption phase can be different from each other and will typically be adapted according to the needs, in particular to the quality of the fluid to be treated.

As an example, the fraction of activated carbon extracted can represent up to 50% by volume of the total volume of activated carbon in the treatment station, typically from 1 to 50% by volume of the total volume of activated carbon in the treatment station. As an example, the quantity of activated carbon injected can represent up to 50% by volume of the total volume of activated carbon in the treatment station, typically from 1 to 50% by volume of the total volume of activated carbon in the treatment station.

Carrying out a gradual renewal (partial and sequenced) will thus eliminate the life cycle effects of the GAC:
    avoiding overquality at the beginning of the cycle while keeping concentrations of all pollutants (including pollutant metabolites) stable at the outlet, and strictly below the authorized limits, and
    avoiding any risk of piercing, entailing a significant and uncontrolled increase in pollutant concentrations at the outlet.

The method according to the invention will preferentially be a semi-automatic method in order to adapt the cycles to the needs, in particular to the concentrations of the pollutants to be removed from the fluid to be treated. In particular, the renewal can be adjusted according to the concentration of pollutants, for example the quantity of activated carbon extracted and the quantity of activated carbon injected can be different from each other, according to needs. The method according to the invention will then make it possible to dispense with heavy maintenance operations requiring complete, sometimes long, shut-downs of the treatment station. Typically, the method of the invention comprises at least one interruption phase and at least one production phase.

During a production phase, the fluid to be treated passes through the bed of activated carbon, typically, the fluid enters the treatment station via an upper inlet, passes through the bed of activated carbon, and leaves the treatment station via a lower outlet. During an interruption phase, the fluid to be treated does not enter the treatment station. An interruption phase can comprise:
    an extraction phase of used GAC, and/or
    an injection phase of new and/or regenerated GAC, and/or
    a phase of removing fines, preferentially in backflow,
    a restarting phase.

The term "used GAC" as defined by the invention, means GAC which has undergone at least one production phase, i.e. the passage of a fluid to be treated. As defined by the invention, the term "new GAC" means GAC that has not undergone a production phase, i.e. that has not been brought into contact with the fluid to be treated. As defined by the invention, the term "regenerated GAC" means GAC which, after having undergone one or more production phases, has been treated, for example thermally or chemically, in order to recover filtration capacities close to the capacities of new GAC.

Depending on the needs, an interruption phase can comprise only an extraction phase or only an injection phase or both, involving either identical or different quantities of GAC. Preferentially, the interruption phases are adapted to the downstream needs of the method, for instance in the case of a drinking water treatment, to the needs of water downstream of the method.

According to one embodiment, the extraction of the GAC is carried out by means of a hydraulic circuit comprising for example one or a plurality of hydroejectors, which can be present in the GAC feed line and/or in the GAC extraction line. The GAC extraction flow-rate can range from 100 to 1000 kg/h, typically from 300 to 700 kg/h, for example 500 kg/h. For the extraction of GAC, a stream of water can be used to feed the one or a plurality of hydroejectors, for example at a flow-rate of 1 to 10 $m^3$/h, typically 1.5 to 5 $m^3$/h, at a pressure ranging from 1 to 10 bar, typically from 2 to 5 bar.

According to one embodiment, the method of the invention comprises a step of removing fines from the activated carbon, implemented after an injection of activated carbon into the treatment station during an interruption phase, preferentially after each step of injecting activated carbon into the treatment station during an interruption phase. Preferentially, the step of removing fines will be implemented during a restarting phase during an interruption phase. For example, depending on the needs of water downstream, the interruption phase can last for a certain amount of time and then the step of removing fines is implemented during the restarting phase.

Thereby, when implemented, the step of removing fines is preferentially implemented within the treatment station. Typically, the step of removing fines removes carbon fines having a size less than 0.2 mm. The step of removing fines makes it possible to dispense with bulky and expensive equipment since the GAC can be injected without pretreatment before injection into the treatment station.

According to one embodiment, the step of removing fines is used in backflow (by means of an ascending stream), preferentially by injection of a first washing solution comprising water. According to one embodiment, the step of removing fines is implemented by injection of air followed by injection of the first washing solution comprising water. Preferentially, the step of removing fines is carried out solely by injection of a first washing solution comprising water, without any air injection step.

The first washing solution for the step of removing fines can comprise raw water, treated water (via passage through the bed of GAC according to the method of the invention), or treated water which can have undergone a subsequent step (downstream of the passage through the GAC bed according to the method of the invention) of chlorination or basification or disinfection or either UV or ozone treatment, or filtration. According to an embodiment with injection of air during the step of removing fines or during the washing step, the treatment station for implementing the method of the invention will comprise an inlet for washing air in the lower part, typically at a lower altitude compared to the inlets for fluid and for GAC.

Generally, the water treatment methods of the prior art, using GAC, implement a step of removing fines upstream of the treatment station, before injecting the GAC into the treatment station, which requires additional installations. By contrast, the method of the invention can be used for an easier management of the fines, due to the implementation of a step of removing fines within the treatment station as such, during an interruption phase, which simplifies the installations needed for implementing the method.

According to one embodiment, the method of the invention comprises, during an interruption phase, a washing step, preferentially carried out in backflow (by means of an ascending stream), distinct from the step of removing fines. The washing step, when used, comprises an injection of a second washing solution comprising water, eventually preceded, by an injection of air. Preferentially, the washing step when used, comprises an injection of air followed by an injection of a second washing solution.

The second washing solution for the washing step can be the identical to or different from the first washing solution for the step of removing fines. The second washing solution for the step of removing fines can comprise raw water, treated water (via passage through the bed of GAC according to the method of the invention), or treated water which can have undergone a subsequent step (downstream of the passage through the GAC bed according to the method of the invention) of chlorination or basification or disinfection or either UV or ozone treatment or filtration.

The step of removing fines can be distinguished from the washing step in that it generally lasts less than a washing step. The step of removing fines will preferentially be implemented after each GAC injection step during the same interruption phase, immediately after injection and preferentially during the restarting phase, which can be implemented after several hours of interruption.

The primary target of the washing step is to remove the effects of filtration, in particular to remove suspended matter between the GAC grains, in the interstices in the volume of the GAC bed. The primary target of the step of removing fines is to remove carbon fines less than 0.2 mm in size.

According to one embodiment, the method comprises at least one step of removing fines and at least one washing step, preferentially used during two different interruptions phases, with the proviso that the step of removing fines is different from the washing step, for example the step of removing fines will generally be shorter than the washing step. Such embodiment reduces the risk of letting fines through, saves equipment since a pretreatment of the GAC is not necessary and since a washing pump will make possible to carry out both a washing step and a step of removing fines, and provides increased operating flexibility since the filtration cycles can be adapted to the needs downstream.

According to one embodiment, a washing step can be used during an interruption phase during which there is neither injection nor extraction of activated carbon. The washing step can be initiated for example according to the number of hours of production or according to the quantity of water treated, or according to the number of hours of interruption or in the event of detection of clogging of the filter (pressure variation between the inlet and the outlet of the filter). It should be noted that during the implementation of the method, the method could comprise an interruption phase with no injection of new and/or regenerated GAC and no extraction of used GAC.

The method according to the invention makes it possible to dispense with the need for a filtration step downstream of the treatment step on a bed of granular activated carbon. Thereby, typically, the method of the invention does not comprise a filtration step by granular or membrane filtration downstream of the activated carbon treatment. The water treatment methods of the prior art tend to add turbidity to the water, which then requires a downstream treatment. The method of the invention will generally not add turbidity.

The method according to the invention is thus particularly well suited to small-sized drinking water production units, typically for treating raw water having a turbidity of less than 2 NFU, and the method can also be coupled with other installations for treating any type of water. More particularly, the method of the invention can work with reduced flow-rates of fluid, typically less than the peak flow-rate. In contrast, the methods of the prior art with a fluidized bed of GAC can only work with a minimum of 10% fluidization, which requires higher flow-rates.

The downward filtration can be used at a pressure ranging from atmospheric pressure (about 1 bar), up to a pressure of 15 bar or 5 bar. According to one embodiment, the bed of activated carbon is pressurized, generally at a pressure ranging from 1.5 bar to 15 bar, preferentially from 1.5 bar to 5 bar. Such pressurized embodiment will be particularly suitable when the method is implemented in small-sized drinking water production units.

When the method is coupled to larger capacity installations, downward filtration will preferentially be used under atmospheric pressure, in which case it will be referred to as "gravity" pressure. The method of the invention can be implemented in an installation comprising at least one treatment station. The treatment station can be a closed treatment station under pressure or an "open" treatment station when the method is implemented at atmospheric pressure.

The invention further relates to an installation for implementing the method according to the invention, comprising at least one treatment station 1, said treatment station comprising:

grains of activated carbon 2, an opening 3 arranged for feeding the fluid to be treated into the treatment station, an opening 4 arranged for injecting grains of activated carbon into the treatment station, an opening 5 arranged for recovering the treated fluid after passing through the bed of activated carbon, an opening 6 arranged for extracting grains of activated carbon from the treatment station.

According to one embodiment, the treatment station further comprises an opening 7 arranged for feeding air into the treatment station during a washing step or a step of removing fines, said opening 7 preferentially being situated at a lower altitude than the opening 4. It should be noted that during a step of removing fines or during a washing step, the opening 3 can be used for the discharge of the water for washing/removing fines from the treatment station and the opening 5 can be used for feeding the washing solution into the treatment station. According to one embodiment, the installation further comprises a hydraulic circuit downstream of the treatment station, connected to the outlet 6. The features described in connection with the method of the invention are also applicable to the installation according to the invention.

An embodiment of a treatment station implemented in the installation of the invention is shown in FIG. 1. As illustrated in FIG. 1, the treatment station 1 comprises:

grains of activated carbon 2, an opening 3 arranged for feeding the fluid to be treated into the treatment station, an opening 4 arranged for injecting new and/or regenerated GAC into the treatment station, eventually, an opening 7 arranged for feeding air into the treatment station during a washing step or during a step of removing fines, an opening 5 arranged for recovering the treated fluid after passing through the bed of activated carbon, an opening 6 arranged for extracting used GAC from the treatment station.

It should be noted that the opening 3 of the treatment station is situated at a greater altitude than that of the opening 5. Preferentially, the opening 4 of the treatment station is situated at a greater altitude than the height of the opening 6. Preferentially, when present, the inlet 7 is situated at a lower altitude than the that of the outlet 6.

According to one embodiment, the opening 3 of the treatment station, during a step of removing fines and/or washing, can be used to discharge the washing solution after removing fines and/or washing. Valve systems will generally be provided for distinguishing the supply line with water to be treated from the discharge line for the washing solution after a step of washing and/or removing fines.

According to one embodiment, the opening 5 of the treatment station, during a step of removing fines and/or washing, can be used to feed in the washing solution before removing fines and/or washing. Valve systems can be provided for distinguishing the draw-off line (after filtration) for treated water from the feed line for the washing solution before a step of washing and/or removing fines. The treatment station can be a metal (closed) filter or else a concrete (open) receptacle.

According to one embodiment, the installation further comprises a hydraulic circuit facilitating the extraction of used GAC. As an example, such a hydraulic circuit can comprise one or a plurality of hydroejectors coupled to a water circuit for extracting the used GAC. If appropriate, said water circuit can comprise a water booster.

According to one embodiment, the installation further comprises a hydraulic circuit facilitating the injection of new and/or regenerated GAC. Typically, the installation of the invention will further comprise a new and/or regenerated GAC storage system and a used GAC recovery system. As an example of storage system, we can cite a storage silo or one or a plurality of bags. Examples of a used GAC recovery systems comprise a recovery bin or a HDPE (high density polyethylene) type tank with a GAC discharge system by overflow or pumping.

According to one embodiment, the used GAC recovery bin is a filtering bin for used GAC. The installation can eventually comprise a reservoir for recovering treated fluid, downstream of the treatment station. Preferentially, the installation does not include a granular or membrane filtration system downstream of the treatment station. The installation will of course include ducts, valves and/or pumps for the circulation of the fluid and/or of the GAC (new/regenerated or used) and/or washing solutions according to the needs.

According to one embodiment, the installation comprises a control device for adapting the nature and the duration of the interruption phases according to the needs, such as the needs downstream of the treatment station. Thus, depending on the needs, an interruption phase can include an injection of new and/or regenerated GAC and/or an extraction of used GAC. It should be noted that during the implementation of the method, the method could comprise an interruption phase with no injection of new and/or regenerated GAC and no extraction of used GAC.

The invention claimed is:

1. A method for treating a fluid, containing pollutants, the method comprising:

passing a downward stream of the fluid through a bed of activated carbon in the form of grains in a treatment station;

partially renewing the activated carbon including at least one injection of activated carbon into the treatment station and at least one extraction of the activated carbon from the treatment station;

a first production phase including passing the downward stream of the fluid through the bed of activated carbon in the treatment station;

a first interruption phase including interrupting the downward stream of the fluid and removing fines from the activated carbon in the treatment station;

a second production phase performed after the first interruption phase, the second production phase including passing the downward stream of the fluid through the bed of activated carbon in the treatment station; and a second interruption phase performed after the second production phase, the second interruption phase including interrupting the downward stream of the fluid and washing the activated carbon in the treatment station, wherein the first interruption phase does not include washing the activated carbon in the treatment station and wherein the second interruption phase does not include removing fines from the activated carbon in the treatment station.

2. The method according to claim 1, wherein the at least one injection of the activated carbon is performed during the first interruption phase.

3. The method according to claim 2, wherein the at least one extraction of the activated carbon from the treatment station is not performed during the first interruption phase.

4. The method according to claim 1, wherein removing fines from the activated carbon in the treatment station includes removing carbon fines having a size less than 0.2 mm from the activated carbon in the treatment station.

5. The method according to claim 1, wherein removing fines from the activated carbon in the treatment station is used in backflow and comprises injecting an ascending stream of a washing solution comprising water through the bed of activated carbon in the treatment station.

6. The method according to claim 1, wherein the bed of activated carbon is a fixed activated carbon bed.

7. The method according to claim 1, further comprising:

adapting the distinct interruption phases according to the needs of the fluid downstream of the treatment station.

8. An installation for treating a fluid, the installation comprising:

a control device; and a treatment station comprising:

(a) a bed of activated carbon in the form of grains, (b) an opening arranged for feeding the fluid to be treated into the treatment station, (c) an opening arranged for injecting activated carbon into the treatment station, (d) an opening arranged for recovering the treated fluid from the treatment station after passing through the bed of the activated carbon, and (e) an opening arranged for extracting the activated carbon from the treatment station, wherein the control device is configured to implement a method for treating the fluid, the method comprising:

passing a downward stream of the fluid through the bed of activated carbon in the treatment station;

partially renewing the activated carbon in the treatment station including at least one injection of activated carbon into the treatment station and at least one extraction of the activated carbon from the treatment station;

a first production phase including passing the downward stream of the fluid through the bed of activated carbon in the treatment station;

a first interruption phase including interrupting the downward stream of the fluid and removing fines from the activated carbon in the treatment station;

a second production phase performed after the first interruption phase, the second production phase including passing the downward stream of the fluid through the bed of activated carbon in the treatment station; and a second interruption phase performed after the second production phase, the second interruption phase including interrupting the downward stream of the fluid and washing the activated carbon in the treatment station, wherein the first interruption phase does not include washing the activated carbon in the treatment station and wherein the second interruption phase does not include removing fines from the activated carbon in the treatment station.

9. The installation according to claim 8, wherein the treatment station further comprises an opening arranged for feeding air into the treatment station.

10. The installation according to claim 8, further comprising a hydraulic circuit downstream of the treatment station, connected to the opening arranged for extracting activated carbon from the treatment station.

11. The method according to claim 1, wherein the fluid is water.

12. The installation according to claim 9, wherein the opening arranged for feeding air into the treatment station is situated at a lower altitude than the opening arranged for extracting activated carbon from the treatment station.

* * * * *